March 19, 1946.    M. B. PALLICH    2,397,040
BROILER
Filed July 24, 1944    2 Sheets-Sheet 1

INVENTOR.
Martin B. Pallich
BY
E. V. Hardway,
ATTORNEY.

March 19, 1946.                M. B. PALLICH                2,397,040
                                  BROILER
                         Filed July 24, 1944          2 Sheets-Sheet 2

Inventor
Martin B. Pallich
By
E. V. Hardway,
Attorney

Patented Mar. 19, 1946

2,397,040

UNITED STATES PATENT OFFICE 2,397,040

BROILER

Martin B. Pallich, Houston, Tex., assignor of eighty per cent to G. C. Sarris, Bexar County, Tex.

Application July 24, 1944, Serial No. 546,345

1 Claim. (Cl. 99—392)

This invention relates to a broiler.

An object of the invention is to provide a utensil of the character described which has been specially designed for broiling meats, fish or similar foods.

Another object of the invention is to provide, in a broiler, a specially constructed removable grill in which the food may be clamped and whereby it may be readily inserted into and withdrawn from the oven.

A further object is to provide, in a broiler, a grill that can be easily cleansed.

With the above and other objects in view the invention has particular relation to certain novel features of construction, arrangement of parts and use, an example of which is given in this specification and illustrated in the accompanying drawings wherein.

Figure 1:
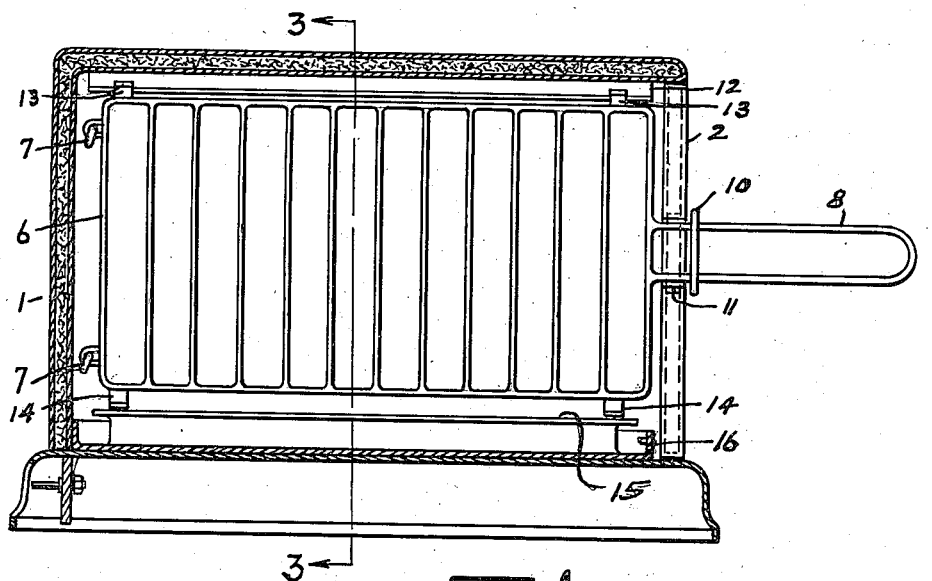
Figure 1 shows a longitudinal sectional view taken on the line 1—1 of Figure 3.
Figure 2:
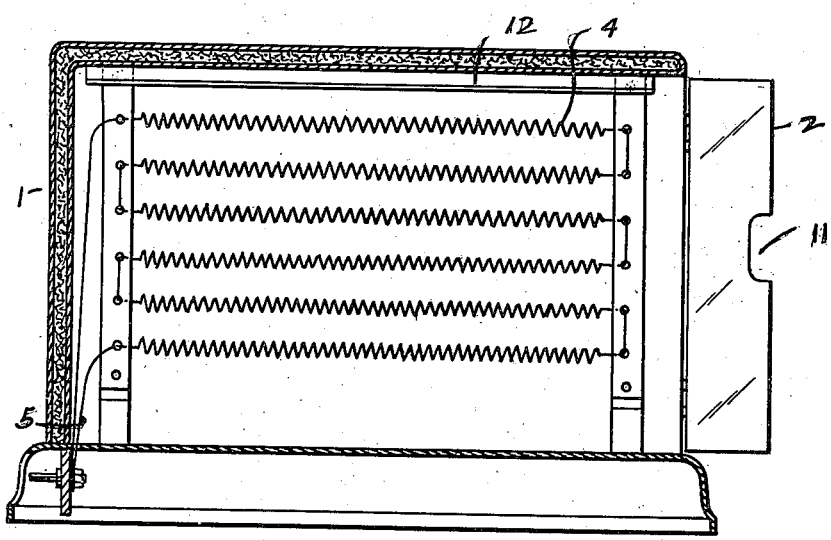
Figure 2 shows a longitudinal sectional view taken on the line 2—2 of Figure 3.

In the drawings the numeral 1 designates an oven as a whole. As illustrated it is formed with the side walls, top and rear end wall composed of metal with asbestos or other insulation between the two ply sheet metal of which these parts are formed. The walls of this oven, of course, may be made of any other suitable material.

The numerals 2, 2 designate the front end doors which extend from top to bottom of the oven and which are hinged thereto and which may be latched closed by any suitable latch as 3.

As illustrated in Figures 1 to 4 there are the electric heating elements, or hot plates 4, 4 one on each side and connected to a suitable source of electrical energy through the electrical conductors 5, 5.

There are two grills 6, 6 which are formed of wire grating as shown in Figure 1 and which are preferably rectangular in shape.

At their inner ends they are loosely connected together by hinges 7, 7 and at their other ends they are formed with handles 8, 8. When the article of food 9 such as meat or fish is placed between the grills 6, 6 the handles are brought into coinciding relation and a band 10 is slipped over the handles to hold the grills in gripping relation with the article to be broiled.

Figure 3:
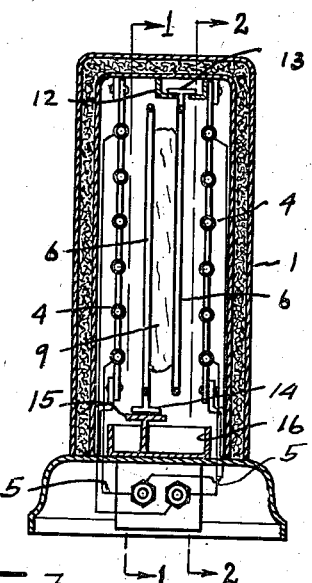
Figure 3 shows a cross sectional view taken on the line 3—3 of Figure 1.
Figure 4:
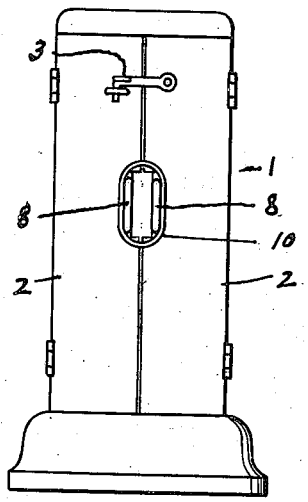
Figure 4 shows an end view.

The doors 2 may be opened and the loaded grill then inserted into the oven in the position shown in Figure 3 and the doors then closed and latched. The doors have an opening 11 through which the handles may project when the doors are closed. These doors may also be composed of sheet metal, form hollow, and filled with insulating material.

The top of the oven has a depending inside track 12 which is channel shaped as shown in Figure 3 and which is slotted to receive the T shaped hangers 13 which fit through said slot and ride along said track. These hangers project upwardly from one of the grills and the other grill has the depending runners 14, 14 which slide on the longitudinal track 15 upstanding from the drip pan 16 which is inserted into the bottom of the oven.

The food, while in the process of broiling, will thus be completely enclosed and protected and will be broiled equally from both sides.

When the article of food clamped between the grills has been sufficiently cooked it may be readily removed by bodily sliding the grills, as a unit, from the oven.

Figure 5:
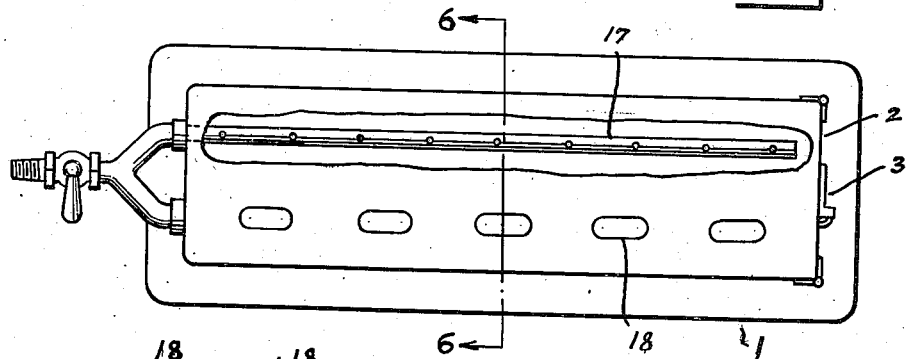
Figure 5 shows a plan view, partly broken away, of an embodiment wherein a gas burner is used for supplying the fuel.
Figure 6:
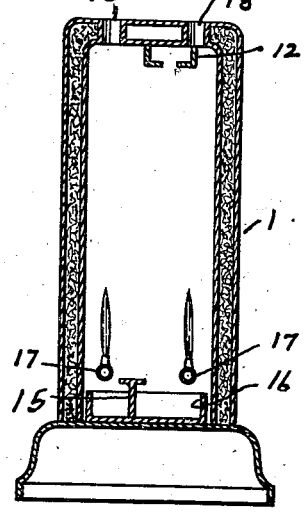
Figure 6 is a cross sectional view taken on the line 6—6 of Figure 5.

As illustrated in Figures 5 and 6 gas burners 17, 17 may be arranged at the bottom of the oven one on each side and connected to a common supply pipe. In case gas is used instead of electricity the top of the oven should be supplied with a sufficient number of outlets 18, for the outlet of the fumes.

The drawings and description are illustrative merely while the broad principle of the invention will be defined by the appended claim.

What I claim is:

A broiler for meats and the like comprising an oven, a channel shaped inside longitudinal track depending from the top of the oven and having a longitudinal slot, a drip pan in the bottom of the oven, a longitudinal track upstanding from the bottom of the drip pan and having a continuous, smooth upper surface, a holder for clamping the article to be broiled comprising spaced grills between which the article is clamped, T-shaped hangers attached to one grill and working through said slot and movable along the depending track, runners spaced apart, longitudinally on the other grill and movable along the upper surface of the upstanding track and heat generating means in the oven on opposite sides of the holder.

MARTIN B. PALLICH.